D. P. ROBINSON & J. COYLE.
END SEAM SOLDERING MACHINE.
APPLICATION FILED NOV. 9, 1911.
1,172,906.
Patented Feb. 22, 1916.
3 SHEETS—SHEET 3.
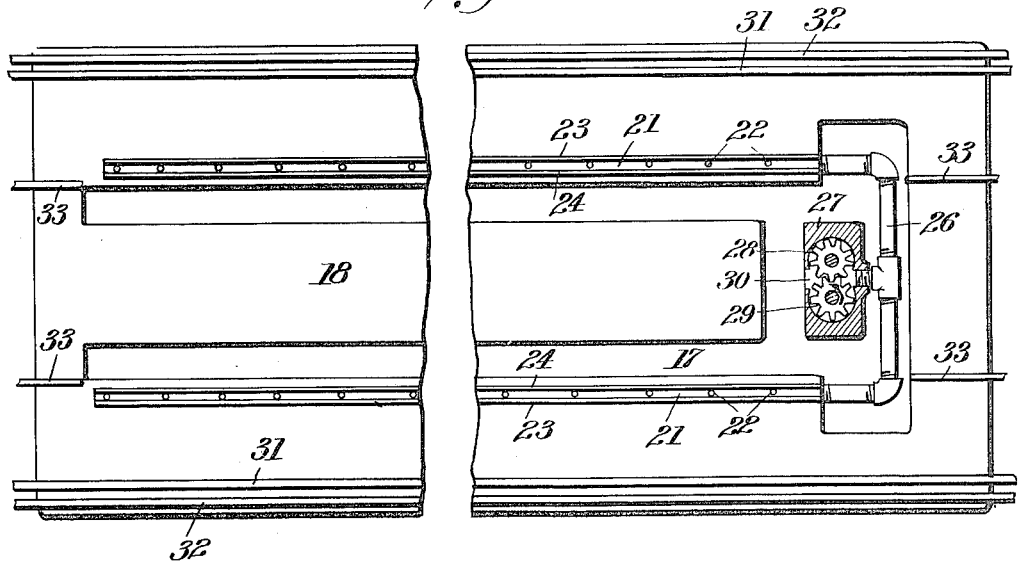
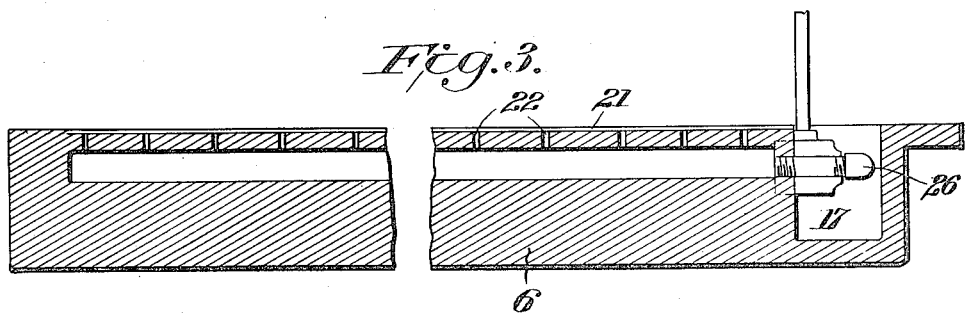
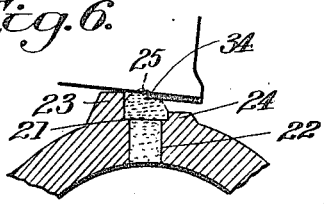
WITNESSES
INVENTORS
Daniel P. Robinson
John Coyle
Sturtevant & Mason
Attorneys

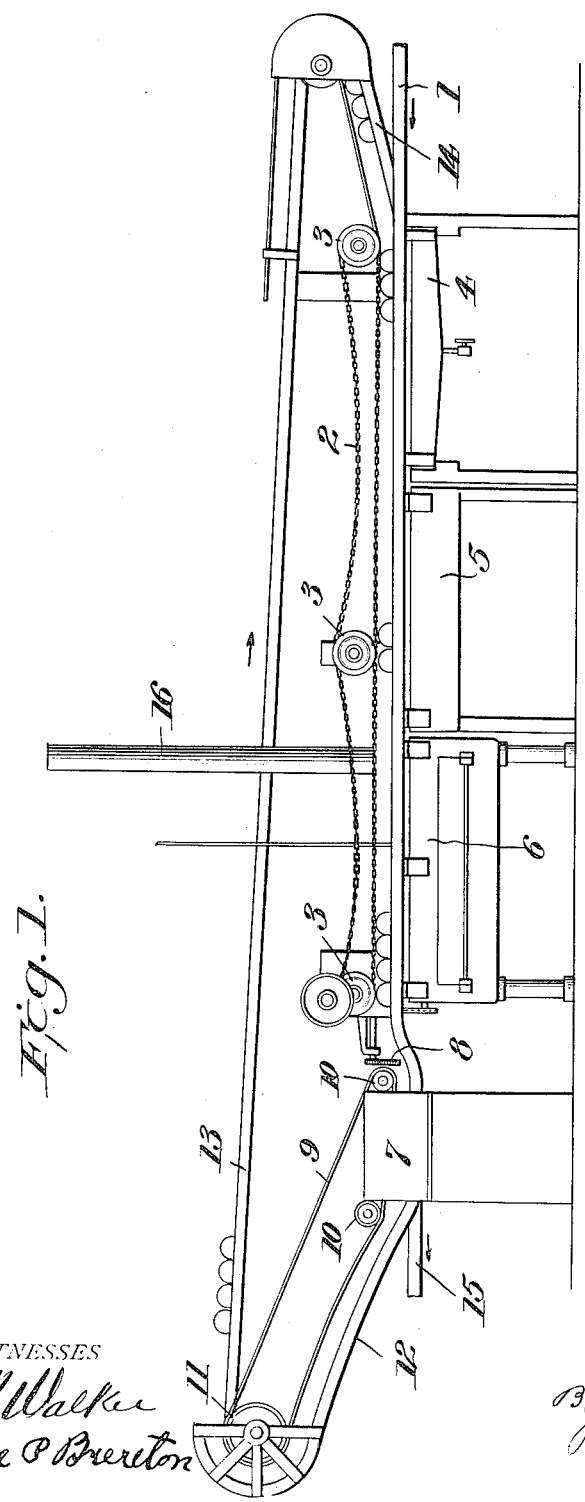

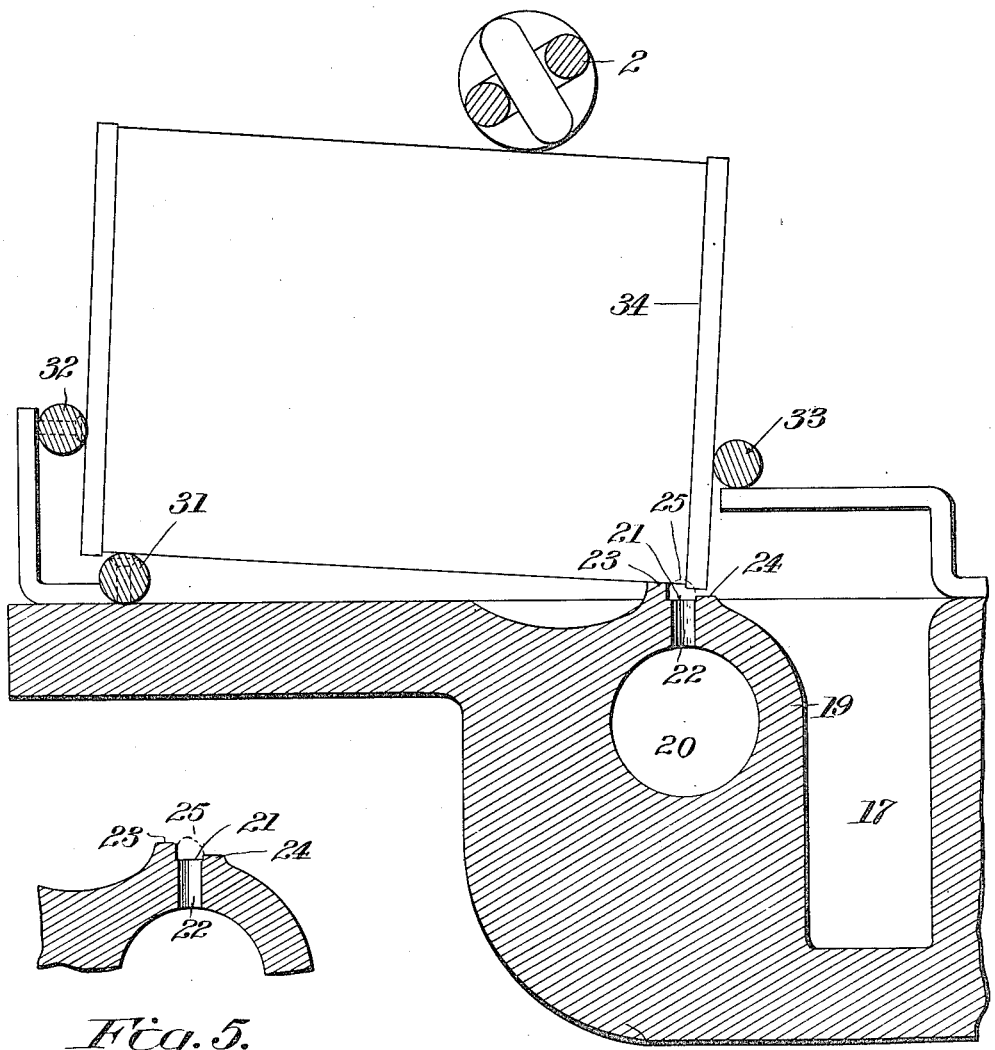

UNITED STATES PATENT OFFICE.

DANIEL P. ROBINSON AND JOHN COYLE, OF BALTIMORE, MARYLAND, ASSIGNORS, BY MESNE ASSIGNMENTS, TO CONTINENTAL CAN COMPANY, INC., A CORPORATION OF NEW YORK.

END-SEAM-SOLDERING MACHINE.

1,172,906.  Specification of Letters Patent. Patented Feb. 22, 1916.

Application filed November 9, 1911. Serial No. 659,345.

*To all whom it may concern:*

Be it known that we, DANIEL P. ROBINSON and JOHN COYLE, citizens of the United States, residing at Baltimore, in the State of Maryland, have invented certain new and useful Improvements in End-Seam-Soldering Machines, of which the following is a description, reference being had to the accompanying drawing and to the letters and figures of reference marked thereon.

The invention relates to new and useful improvements in machines for soldering ends on sheet metal cans. Prior to this invention, it has been common to use a solder bath for applying molten solder to the joint between the end and the can body; the cans being subjected to a flux bath on their travel to the solder bath, and the soldered portion of the can being wiped as the can leaves the solder bath, so that the surplus solder applied to the can may be removed. By machines of this character, cans may be very rapidly soldered, and at small labor cost, but at considerable waste of solder, owing to the fact that the immersion of the circumferential corner of the can in the molten solder to the necessary depth to cause the solder to properly cover the joint, causes a coating of solder to adhere to the outside periphery of the can end flange, and to a narrow belt of the can body surface above the can end flange, and also to the outer annular portion of the flat surface of the can end. Furthermore, by this immersion method of applying solder to the can end, more or less solder is caused to flow inside the can body, owing to the fact that the tilted can body when immersed displaces the molten solder, so that the inner corner of the can body at the soldering point is beneath the surface of the molten solder, and, therefore, at the side seams or at other points where the head does not snugly engage the can body, the molten solder will run into the can. This unnecessary coating of the outside of the can body and can end and this inside coating, add nothing to the security of the joint, but, on the other hand, the solder inside the can causes the can to be more or less unsanitary, and the unnecessary solder outside of the can detracts from the neat appearance of the can.

An object of the present invention is to provide devices for applying molten solder in the form of a bead directly to the joint between the can end and the body of the can, without immersing the circumferential corner of the can in the molten solder, so that all liability of causing the solder to flow into the can body is avoided, and the unsightly and unnecessary coating of the can body and can end at points remote from the joint, is also avoided.

A further object of the invention is to provide a device of the above character wherein the bead of molten solder is formed by a receptacle having a longitudinal recess or slot formed therein, with devices for supplying the receptacle with the molten solder and for forcing a bead of solder above the side edges of the slot or recess.

These and other objects will in part be obvious, and will in part be hereinafter more fully described.

In the drawings which show by way of illustration one embodiment of the invention, Figure 1 is a side elevation showing more or less diagrammatically the general arrangement of the parts of the machine embodying the improvements; Fig. 2 is an enlarged sectional view through the solder-applying devices, showing a bead of solder being applied to the joint between the end and the can body; Fig. 3 is a longitudinal sectional view through the solder-applying devices; Fig. 4 is a plan view showing the soldering bath with the improved solder-applying means formed therein; and Fig. 5 is an enlarged detail showing the bead of molten solder as applied to the joint between the can end and the can body. Fig. 6 is an enlarged transverse section through the upper part of the solder applying receptacle.

In carrying out the invention, devices are provided whereby the can with the end thereon is presented first to a flux bath, and then to a preheating device where the parts of the metal to receive the solder are heated, and then to the improved solder-applying devices, and from the solder-applying devices to a wiping device where the surplus solder is removed, after which the can is again carried to the front end of the machine and the opposite end caused to pass in succession to the fluxing bath, the preheater, the soldering bath and the wiping means, so that first one end of the can body and then the other is soldered.

Referring more in detail to the drawings, Fig. 1 shows a soldering machine which embodies a suitable supporting framework, on which is mounted a runway 1 along which the cans are conveyed to the soldering machine. This runway consists of suitable supporting angle-bars. The portion of the runway through the soldering machine and the parts adjacent thereto are substantially horizontal, and the cans are carried along said horizontal portion of the runway by a conveyer 2. This conveyer, as herein shown, is of the link chain type. It is obvious, however, that any other form of conveyer may be used for this purpose. Said chain 2 runs over suitable pulleys 3, 3, and the pulley 3 at the left hand end of the machine, as viewed in Fig. 1, may be driven from a suitable source of power. This conveyer chain 2 rests by gravity on top of the can bodies, and if the can bodies are round, will cause the same to roll along the supporting runway for the can bodies.

While the machine, as herein illustrated, is especially adapted for operating upon round can bodies, it will be obvious that said machine may also be used for soldering can bodies of other shapes, such as oval can bodies and square can bodies or the like, the only change necessary to accomplish the soldering of different shaped can bodies, being the substitution of the various well known devices for causing square can bodies or other shaped can bodies to be properly presented to the soldering devices.

Referring again to Fig. 1, the can bodies which are carried along the horizontal portion of the runway 1 by the conveyer chain 2, are first brought to a fluxing bath 4, which is of the usual type and will not need to be described in detail. The joint between the end and the can body is here properly fluxed, preparatory to receiving the solder. After passing the fluxing bath, the can is carried by a preheater 5. This preheater may be of any desired construction, and will operate to preheat the parts of the metal adjacent the joint to which the solder is to be applied. The can body in its preheated condition, passes directly to the soldering devices 6, which will be hereinafter more fully described. After leaving the soldering devices, the can bodies pass along the runway 1, which is inclined downwardly beyond the end of the conveyer 2, so that the can bodies will roll down into the wiping apparatus.

The wiping apparatus consists of a suitable casing 7, in which is mounted a rotating wiping brush which is operated from suitable gears 8. The can bodies are carried through the wiping apparatus by a conveyer belt 9, which passes over suitable pulleys 10, 10, at each end of the apparatus, and also over a suitable pulley 11 mounted on the framework of the machine.

As the cans roll through the wiping apparatus, the rotating brush will remove the surplus solder from the outer parts of the cans. The cans are then caused to travel up the inclined runway 12, and are delivered on to the runway 13 by which the cans are brought again to the front end of the machine, and through the runway 14 delivered to the opposite side of the machine, so that the other end of the can may pass in succession through the fluxing bath 4, the preheater 5, the soldering device 6, and the wiping apparatus 7, after which the cans pass along the runway 15 from the machine.

The soldering devices 6, as herein shown, consist of a suitable heating chamber having a vent pipe 16. This heating chamber is located directly underneath the solder bath 17. The solder bath 17 extends along each side of the machine directly under the runway for the cans, and a central partition 18 extending from one end of the bath to a point short of the other end, divides the bath, but at the same time allows the divided parts of the bath to be connected.

Extending along the side of the bath is a partition 19, which forms a receptacle 20. This receptacle 20, as herein shown, is located at the extreme outside of the bath. A similar partition 19 is arranged along the other side of the bath, forming also a similar receptacle 20.

The solder bath is heated by the chamber beneath the same, and the solder in the solder bath, and also in the receptacles at the sides of the bath, will be kept in a molten condition. Each receptacle 20 at its upper face is formed with a recess or slot 21. This recess or slot 21 may extend to the receptacle 20, or may be connected thereto by openings 22, spaced along the receptacle, as shown in Fig. 3. The outer wall 23 forming the side wall of the slot 21 extends slightly above the upper face of the receptacle and forms, as herein shown, a supporting surface for the can as it is presented to the soldering device. This supporting rib or wall 23 engages the body portion of the can at a point adjacent the joint between the flange of the can end and the can body.

The wall 24 forming the other edge of the slot or recess 21 projects only slightly above the upper surface of the receptacle, and as a matter of fact, this projecting wall 24 may be entirely omitted, with good results.

In the operation of the device, the receptacles at each side of the solder bath are filled with molten solder, and said solder is placed under sufficient pressure to cause a bead 25 of molten solder to rise in the slot or recess 21.

As herein shown, the receptacles 20 at each side of the bath are connected by pipes 26 to a pump 27. This pump 27 consists of two gear wheels 28 and 29, which intermesh and rotate in suitable pumping chambers formed therefor. The molten solder passes from the bath through the opening 30 into the pump. The molten solder may be taken by the projecting teeth of the gears through the pumping chamber and delivered into the pipes 26, which lead to the receptacles 20. The gears of the pump may be rotated in any suitable way. Said gears are located beneath the solder bath, so that the pump is entirely immersed, and the molten solder carried from the solder bath directly to the receptacles, without being exposed to the air, where it may be oxidized or chilled.

The pump may be so regulated that the receptacles will be filled with molten solder and the bead raised in the slot 21 to the desired extent. The feed is preferably so regulated that this bead is raised only sufficiently to contact with the can body, and not to cause the solder to overflow at the edge of the slot. If, however, the feed is for any reason greater than the demand for the solder, the overflow of the solder will occur at the right of the slot, as viewed in Fig. 2, and the overflowing solder will run back into the solder bath.

The can body as it passes through the soldering mechanism, rests at one end, as above noted, on the projecting lip 23, which forms the side wall of the slot. The other end of the can body engages a guide 31 on which said can body moves. A guide 32 is arranged adjacent this end of the can body to hold the can in proper position relative to the soldering mechanism. The guide 33 is also provided adjacent the end of the can being soldered, and this guide determines the path of travel of the can body relative to the bead of molten solder. The guide 31 is preferably arranged slightly higher than the supporting lip 23, so that the can body will be slightly tilted.

The guide 33 is preferably so positioned that the plane containing the outer face of the can end is entirely at one side of the slot or recess forming the bead of molten solder. Said guide is also so positioned that the edge 34 of the flange of the can end will be immersed in the bead of molten solder.

By the construction herein shown, where the lip or wall 23 of the recess is arranged at a higher level than the lip or wall 24, and the solder bead is produced by positive force through the molten solder, said bead of solder will take the form clearly shown in Figs. 2 and 5, wherein one side of the bead is raised much higher than the other. The adhesion between the solder and the wall 24, will prevent the solder overflowing and allow the force applied against the solder to produce a raised bead, which extends to some distance above this wall of the slot. The wall 23 of the slot which extends much higher than the slot 24, and serves as a support for the can body, will, through capillary attraction, cause the opposite side of the bead to rise still higher, and, therefore, the bead of solder will take the form in cross section as shown in Fig. 5. By this raising of one side of the bead of the solder, said bead is brought up into contact with the joint between the can end and the can body, and the edge of the flange of the can end will be immersed sufficiently in the solder bead to cause said molten solder to flow by capillary attraction between the contacting parts of the flange of the can end and the end of the can body. By this construction, however, no molten solder is applied to the outer face of the end of the can body and comparatively little solder is applied to the outer face of the flange, where the solder so applied is purely wasted. In other words, by this construction, a small bead of molten solder is formed, and the contacting portion of the solder bead is concentrated at the exact point where the same should be applied to the can end for the purpose of forming a proper joint. By this arrangement, no unnecessary solder is applied to the can body, and thereby the waste of solder necessarily occurring where the corner of the can body to be soldered is immersed, is avoided. Furthermore, by this contracted bead of solder placed at the exact point where required for sealing and forming the joint, there is not only a great saving of solder, but also a much brighter, cleaner and better looking can produced, than by that type of machine wherein molten solder is applied to the end seam by immersion. Then again, the guide rail 30 for the outer end of the can body, is arranged so that the can body is inclined only slightly to the horizontal. By thus positioning the can body, together with the fact that the corner being soldered is not immersed, little or no molten solder will pass inside of the can body.

While in the present drawings the can body is shown as supported by the receptacle forming the bead of molten solder, it will be obvious from certain aspects of the invention, that said can bodies may be otherwise supported. It will also be obvious that the shape of the projecting walls forming the slot may be varied, the essential feature being the forming of a relatively narrow bead of molten solder, and the applying of the same directly to the edge of the can end without immersing the corner of the can in the solder bath.

By the construction above described, an end-soldering machine is produced which has all the advantages of rapid work and low cost of labor of the ordinary immersion solder bath, with the additional advantages of comparatively little or no waste of solder; and the producing of a cleaner, brighter and better looking can. Furthermore, the flow of the solder inside of the can, as in the common method of applying the solder by a solder bath, (which inside flow not only causes a waste of solder, but produces an unsanitary can condemned by the pure food laws), is entirely avoided.

It is obvious that minor changes in the details of construction and arrangement of parts may be made, without departing from the spirit of the invention, as set forth in the appended claims.

Having thus described our invention, what we claim as new and desire to secure by Letters Patent, is:—

1. A soldering machine for sheet metal cans including in combination, guides along which the can may be moved, means for moving the cans along the guides, and a soldering mechanism comprising a receptacle having a slot or recess in its upper side, means for supplying said receptacle with molten solder and for forcing a uniform bead of molten solder above the side edges of the slot or recess, one wall of said slot or recess being higher than the other, relative to the side face of the can body, whereby the bead of solder may be raised to a greater extent on one side than on the other.

2. A soldering machine for attaching can ends to can bodies including in combination, guides along which the can may be moved, means for moving the can along the guides, a soldering mechanism comprising a receptacle having a slot or recess at its upper side, means for supplying said receptacle with molten solder and forming a uniform bead of molten solder above the side edges of the slot or recess, one of the side edges of the slot or recess being raised higher than the other, relative to the side face of the can body, whereby said beads of solder through adhesion to the lower wall and through the capillary attraction of the other wall, are caused to form higher on one side than on the other, said beads of molten solder being so disposed relative to the guides as to be applied to the edge of the flange of the can end.

In testimony whereof we affix our signatures in presence of two witnesses.

DANIEL P. ROBINSON.
JOHN COYLE.

Witnesses:
JOHN W. HEWES,
MARK A. ELLIOTT.